(12) United States Patent
Gallimore

(10) Patent No.: US 10,100,662 B2
(45) Date of Patent: Oct. 16, 2018

(54) MECHANICAL DEVICE FOR AMPLIFYING RELATIVE DISPLACEMENT

(71) Applicant: ROLLS-ROYCE plc, London (GB)

(72) Inventor: Stephen Gallimore, Lincoln (GB)

(73) Assignee: ROLLS-ROYCE plc, London (GB)

( * ) Notice: Subject to any disclaimer, the term of this patent is extended or adjusted under 35 U.S.C. 154(b) by 213 days.

(21) Appl. No.: 15/276,304

(22) Filed: Sep. 26, 2016

(65) Prior Publication Data

US 2017/0114656 A1 Apr. 27, 2017

(30) Foreign Application Priority Data

Oct. 26, 2015 (GB) .................................. 1518881.6

(51) Int. Cl.
| | |
|---|---|
| *G01L 1/12* | (2006.01) |
| *F01D 17/04* | (2006.01) |
| *G01B 7/14* | (2006.01) |
| *G01L 5/00* | (2006.01) |

(52) U.S. Cl.
CPC ............. *F01D 17/04* (2013.01); *G01B 7/144* (2013.01); *G01L 1/12* (2013.01); *G01L 5/0023* (2013.01); *F05D 2220/32* (2013.01); *F05D 2260/30* (2013.01); *F05D 2260/80* (2013.01)

(58) Field of Classification Search
CPC ......... F01D 17/04; G01L 5/0023; G01L 1/12; G01B 7/144; F05D 2260/30; F05D 2260/80; F05D 2220/32
USPC ............. 73/862.49, 862.53, 862.392; 33/706
See application file for complete search history.

(56) References Cited

U.S. PATENT DOCUMENTS

| | | | | | |
|---|---|---|---|---|---|
| 3,722,264 | A | * | 3/1973 | Talmo ................... | G01L 9/0035 73/726 |
| 4,129,036 | A | * | 12/1978 | Bliemeister ............... | G01L 5/12 384/549 |
| 4,142,408 | A | * | 3/1979 | Riazuelo ................... | G01L 1/22 73/862.49 |

(Continued)

FOREIGN PATENT DOCUMENTS

| | | |
|---|---|---|
| CA | 1 115 542 A | 1/1982 |
| WO | 2001/010723 A1 | 2/2001 |

OTHER PUBLICATIONS

May 18, 2016 Search Report issued in British Patent Application No. GB151881.6.

*Primary Examiner* — Jonathan Dunlap
(74) *Attorney, Agent, or Firm* — Oliff PLC

(57) ABSTRACT

A mechanical device is provided for amplifying relative displacement between first and second mechanical structures operatively connected to opposite sides of a bearing. The relative displacement is caused by a thrust load on the bearing. The device includes a first bracket portion attachable to the first mechanical structure. The device further includes a compliant mechanism which extends from the first bracket portion to make contact with the second mechanical structure. The compliant mechanism is configured such that a measurement end of the mechanism moves in response to relative displacement between the first and second mechanical structures. The compliant mechanism is further configured such that the movement of the measurement end amplifies the relative displacement. The device further includes a sensor which measures the mechanically amplified movement of the measurement end.

16 Claims, 4 Drawing Sheets

(56) References Cited

U.S. PATENT DOCUMENTS

| | | | |
|---|---|---|---|
| 4,385,768 A | 5/1983 | Swearingen | |
| 4,419,901 A * | 12/1983 | Ruppert | F16C 19/28 |
| | | | 73/862.49 |
| 4,899,600 A * | 2/1990 | Lee | G01G 7/06 |
| | | | 177/210 C |
| 5,291,793 A | 3/1994 | Roudavitch | |
| 6,105,439 A * | 8/2000 | Roger | G01L 5/12 |
| | | | 73/862.392 |
| 9,964,466 B1 * | 5/2018 | Nicholson | G01M 13/04 |
| 2007/0014498 A1 * | 1/2007 | Aoki | F16C 19/186 |
| | | | 384/448 |
| 2016/0202131 A1 * | 7/2016 | Roy | G01L 1/086 |
| | | | 73/650 |

* cited by examiner

W = nX
Z = Y-(X+W)

MECHANICAL DEVICE FOR AMPLIFYING RELATIVE DISPLACEMENT

FIELD OF THE INVENTION

The present invention relates to a mechanical device for amplifying relative displacement between first and second mechanical structures operatively connected to opposite sides of a bearing.

BACKGROUND

Rotating shafts, such as those used in gas turbine engines, typically require bearings to support relatively moving or rotating components. Where light weight and minimum power loss from friction are required, ball and roller element bearings are common, and may be used to react both radial and thrust loads.

Individual bearings inevitably have a limited thrust capability. Thus two or more bearings may be arranged adjacent one another to share the thrust load in so-called "stacked" bearing arrangements. Nonetheless, it can be still be desirable to control and limit thrust loads, particularly in large high bypass ratio engines where the thrust loads can be significant.

A difficulty arises, however, in that it can be difficult for an engine operator to determine loads imposed on bearings in operation, leading to uncertainty with regard to service life and maintenance schedules.

SUMMARY

Accordingly, in a first aspect, the present invention provides a mechanical device for amplifying relative displacement between first and second mechanical structures (which, for example, may be operatively connected to opposite sides of a bearing, the relative displacement being caused by a thrust load on the bearing), the device including:

a first bracket portion attachable to the first mechanical structure, a compliant mechanism which extends from the first bracket portion to make contact with the second mechanical structure, the compliant mechanism being configured such that a measurement end of the mechanism moves in response to relative displacement between the first and second mechanical structures, the compliant mechanism further being configured such that the movement of the measurement end amplifies the relative displacement; and a sensor which measures the mechanically amplified movement of the measurement end.

Advantageously, by mechanically amplifying the relative displacement, the measurement accuracy of the sensor can be increased. Further, a mechanical form of amplification can be reliably used in environments which may be subject to thermal excursion, mechanical vibration, aero loading etc.

In a second aspect, the present invention provides a gas turbine engine having first and second mechanical structures operatively connected to opposite sides of a bearing, the first and second mechanical structures being fitted with a mechanical device according to the first aspect. For example, the bearing may support a shaft of a spool of the engine.

In a third aspect, the present invention provides a method of controlling thrust load on a bearing having first and second mechanical structures operatively connected to opposite sides thereof, the first and second mechanical structures being fitted with a mechanical device according to the first aspect, the method including: using the sensor of the mechanical device to measure the mechanically amplified movement of the measurement end; and controlling the thrust load on the bearing on the basis of the measured movement. For example, the bearing may support a shaft of a spool of a gas turbine engine, the thrust load on the bearing being controlled by varying a compressor bleed pressure which acts on a rotor or rotors of the engine in a direction which opposes the thrust load.

Optional features of the invention will now be set out. These are applicable singly or in any combination with any aspect of the invention.

The compliant mechanism may be configured to amplify relative movement in a direction which is substantially perpendicular to a line between the point at which the compliant mechanism extends from the first bracket portion and the point of contact of the compliant mechanism with the second mechanical structure. Advantageously, the distance between these points may also be the shortest distance between the first and second mechanical structures.

For example, the compliant mechanism may be a compliant arm, the first bracket portion and the measurement end being at opposite ends of the arm, and the second mechanical structure making contact between the ends of the arm.

The compliant mechanism may be configured to amplify the relative displacement at the measurement end by at least a factor of five. The compliant mechanism may be configured to amplify the relative displacement at the measurement end by at most a factor of ten.

Conveniently, the device may further include a second bracket portion attachable to the second mechanical structure. The first and second bracket portions may be formed as a unitary body.

Conveniently, the device may further include a support which extends to a mount portion facing the measurement end, the sensor being mounted at the mount portion. For example, the support may extend from the first bracket portion, or from the second bracket portion if present. According to another option, however, the sensor may be mounted on the compliant mechanism.

The sensor can be a proximity sensor, such as an eddy current sensor.

The first and second mechanical structures and the bearing may be parts of a gas turbine engine. For example, the bearing can support a shaft of a spool of the engine.

The bearing may be a ball bearing, tapered roller bearing or a cylindrical roller bearing.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
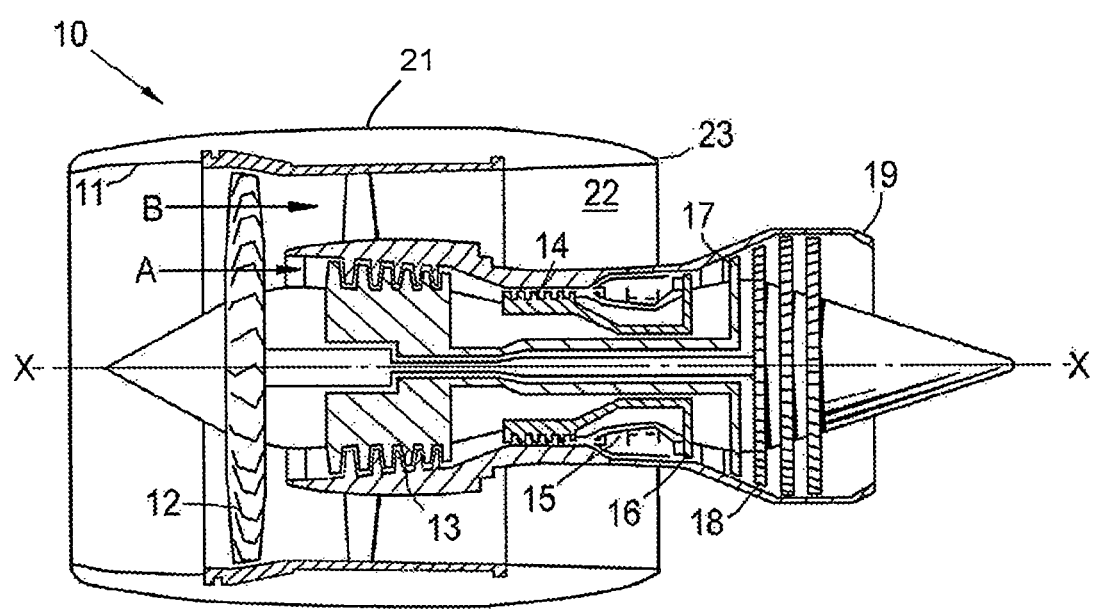
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts, each set of a turbine, compressor/fan and shaft forming a spool of the engine.

Figure 2:
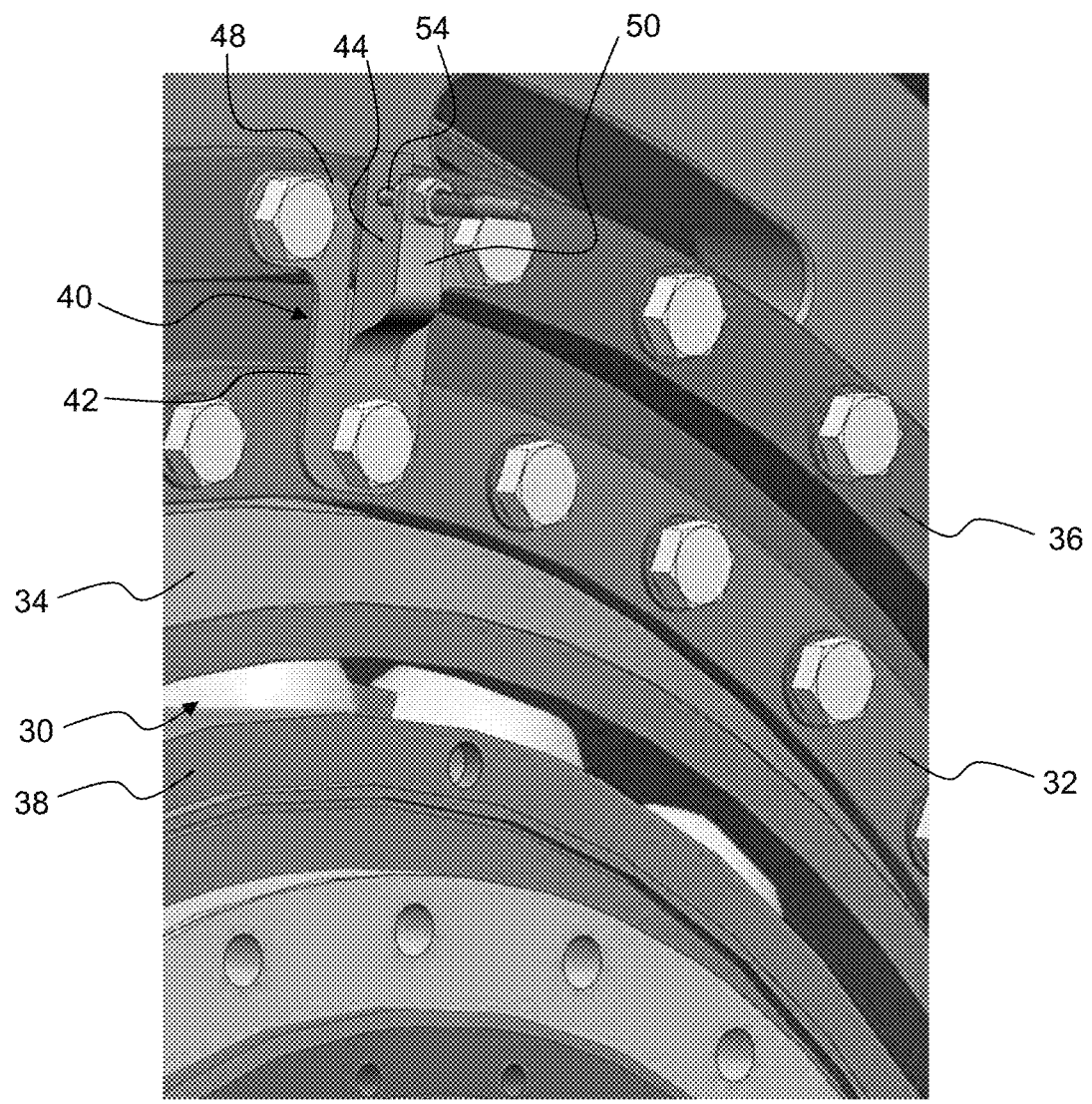
FIG. 2 shows a ball bearing which supports an interconnecting shaft of the engine of FIG. 1, and a mechanical device for determining a thrust load on the bearing.
Figure 3:
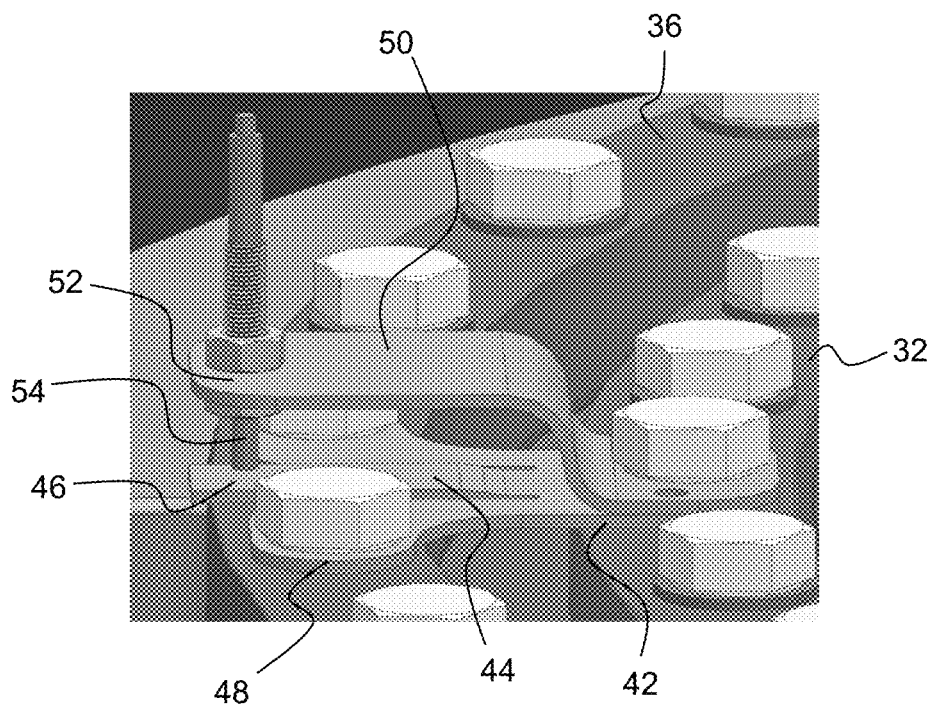
FIG. 3 shows a close-up in the side view of the mechanical device of FIG. 2.

FIG. 2 shows a ball bearing 30 which supports one of the interconnecting shafts of the engine. Thrust loads acting on the bearing can reduce the life of the bearing. These loads can be mitigated to an extent by allowing compressor bleed pressure to act on a rotor or rotors of the engine in a direction opposite to the loads. However, compressor bleed should be used sparingly as bleeding air from a compressor reduces the efficiency of the engine. Thus the engine has a mechanical device 40 which can be used to determine the thrust load so that an appropriate amount of corrective action can be taken. The device, which is also shown in close-up in the side view of FIG. 3, is located in a part of the engine where it is largely unaffected by external effects, such as thermal or aero loadings.

A first flange 32 is operatively to a bearing ring 34 on one side of the bearing 30, and a second flange 36 is operatively to a bearing ring 38 on the other side of the bearing. The thrust load acting on the bearing causes a relative displacement in the axial direction of the engine between mechanical structures on opposite sides of the bearing, such as the first and second flanges. The mechanical device 40 amplifies and measures this relative displacement, which in turn correlates with the thrust load.

More particularly, the mechanical device 40 has a first bracket portion 42 which is bolted to the first flange 32. A compliant arm 44 extends from the first bracket portion to make contact with the second flange 36. The arm then extends further from this point of contact to terminate in a measurement end 46. To further stabilise the device, a second bracket portion 48, which is unitary with the first bracket portion 42, bolts to the second flange 36. The bracket portions are substantial enough to fix the device, but not so substantial that they significantly affect the relative displacement of the flanges. A curved support 50 extends from the first bracket portion 42 and terminates in a mount portion 52 at which an eddy current proximity sensor 54 is mounted spaced from, but facing, the measurement end 46.

Figure 4:
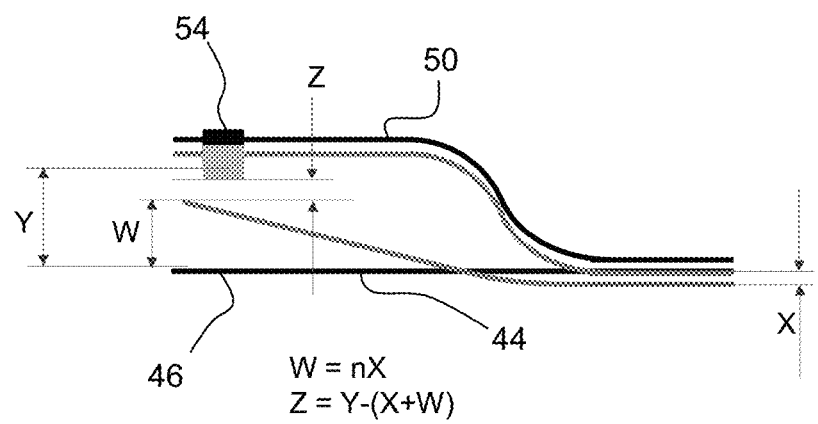
FIG. 4 shows schematically a side view of the mechanical device of FIGS. 2 and 3 under two different thrust load conditions.

FIG. 4 shows schematically a side view of the compliant arm 44 and the support 50 under two different thrust load conditions acting on the bearing 30. Under a first condition of little or no thrust load indicated with dark lines, the faces of the two flanges 32, 36 are essentially co-planar so that the compliant arm 44 lies flat on the face of the second flange 36. Under a second condition of significant thrust load indicated with light lines, the first flange 32 moves vertically downwards in the plane of the drawing relative to the second flange 36 by an amount X. This causes the compliant arm 44 to pivot on the inner edge of the second flange such that the measurement end 46 of the arm deflects upwards by an amount W. This upwards deflection W is greater by a factor n than the corresponding downwards movement X of the proximity sensor 54. Thus under the first condition, the proximity sensor 54 measures a distance Y to the measurement end 46, while under the second condition it measures a distance $Z=Y-(X+W)$, whereby $X=(Y-Z)/(1+n)$. The amplification "gain" $(1+n)$ provided by the device 40 may typically be in the range from about five to ten. The amount of gain can be controlled by varying the length of the arm, which changes the distance from the pivot point on the inner edge of the second flange to the measurement end.

The measured relative displacement can then conveniently be used to determine a suitable amount of compressor bleed to control the thrust load on the bearing 30.

The compliant arm 44 amplifies relative movement in a direction which is substantially perpendicular to a line between the point at which the arm joins the first bracket portion 42 and the point of contact of the arm with the inner edge of the second flange 36. Advantageously, the distance between these points is also the shortest distance between the first 32 and second 36 flanges.

Figure 5:
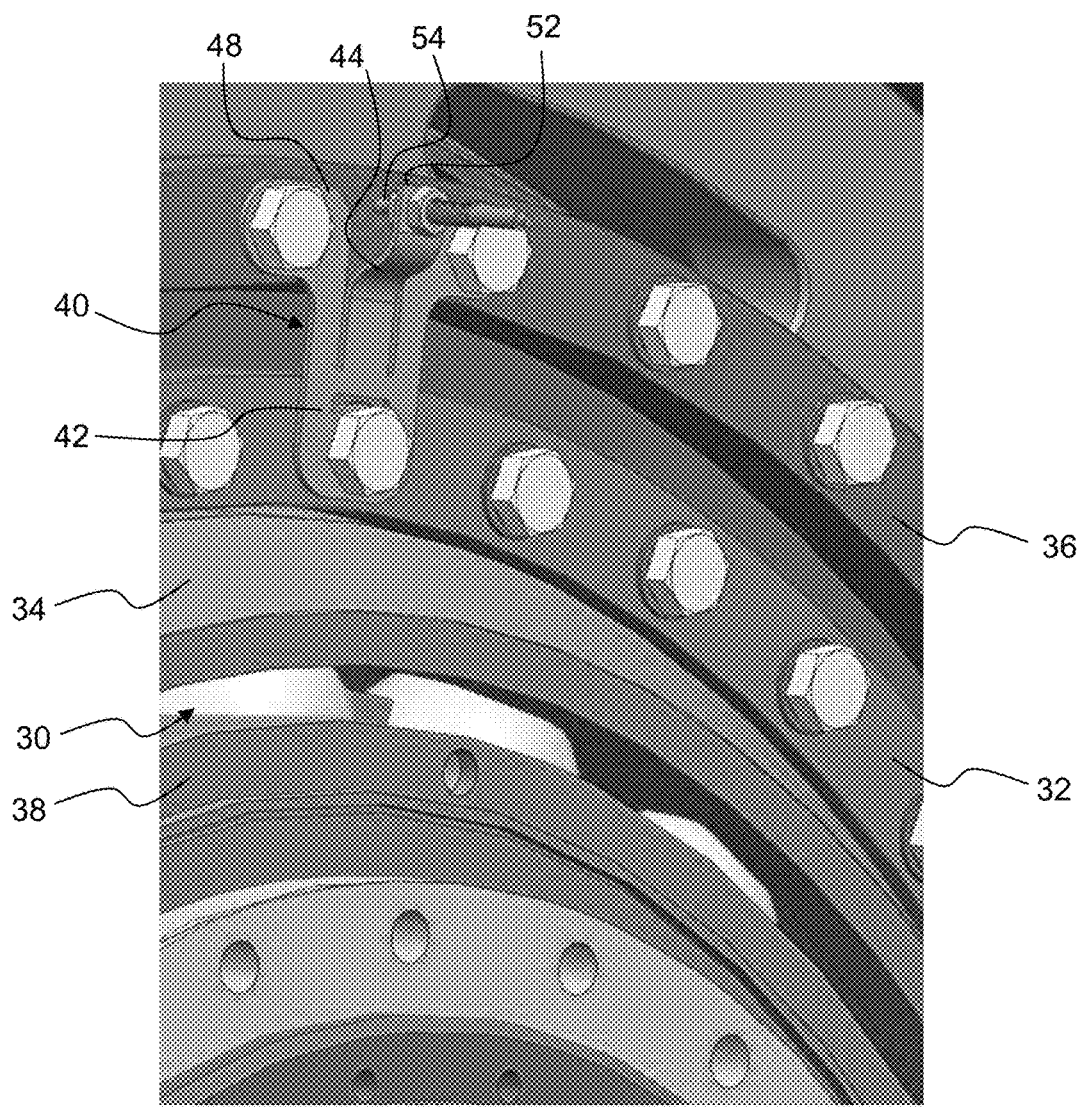
FIG. 5 shows a variant of the mechanical device of FIGS. 2 to 4.

FIG. 5 shows a variant of the mechanical device for determining a thrust load on the bearing. In the variant, the compliant arm 44 is also the curved support for the eddy current proximity sensor 54. The arm again makes contact with the inner edge of the second flange 36, and relative displacement of the flanges along the axial direction of the engine is amplified into greater movement of the measurement end 52 of the arm where the sensor is mounted. The sensor measures the distance to the face of the second flange. Thus, in this variant a relative displacement of the flanges in which the first flange 32 moves to the left in the plane of the drawing and the second flange 36 moves to the right results in an increase in the distance measured by the sensor. This is in contrast to the device of FIGS. 2 to 4, in which such a movement would result in a decrease of the measured distance. Nonetheless, in both cases the change in measured distance (i.e. the measured movement) is an amplification of the relative displacement of the flanges.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A mechanical device for amplifying relative displacement (X) between first and second mechanical structures operatively connected to opposite sides of a bearing, the relative displacement being caused by a thrust load on the bearing, the device including:
- a first bracket portion attachable to the first mechanical structure operatively connected to first side of the bearing,
- a compliant mechanism which extends from the first bracket portion to make contact with the second mechanical structure operatively connected to a second side of the bearing, the compliant mechanism being configured such that a measurement end of the mechanism moves in response to relative displacement between the first and second mechanical structures, the compliant mechanism further being configured such that the movement of the measurement end amplifies the relative displacement; and
- a sensor which measures movement of the measurement end which is mechanically amplified.

2. A mechanical device according to claim 1, wherein the compliant mechanism is configured to amplify relative displacement in a direction which is substantially perpendicular to a line between the point at which the compliant mechanism extends from the first bracket portion and the point of contact of the compliant mechanism with the second mechanical structure.

3. A mechanical device according to claim 1, wherein the compliant mechanism is a compliant arm, the first bracket portion and the measurement end being at opposite ends of the arm, and the second mechanical structure making contact between the ends of the arm.

4. A mechanical device according to claim 1, wherein the compliant mechanism is configured to amplify the relative displacement at the measurement end by at least a factor of five.

5. A mechanical device according to claim 1, wherein the compliant mechanism is configured to amplify the relative displacement at the measurement end by at most a factor of ten.

6. A mechanical device according to claim 1, wherein the device further includes a second bracket portion (48) attachable to the second mechanical structure.

7. A mechanical device according to claim 1, wherein the device further includes a support (50) which extends to a mount portion (52) facing the measurement end, the sensor being mounted at the mount portion.

8. A mechanical device according to claim 1, wherein the sensor is a proximity sensor.

9. A mechanical device for amplifying relative displacement (X) between first and second mechanical structures, the device including:
- a first bracket portion attachable to the first mechanical structure,
- a compliant mechanism which extends from the first bracket portion to make contact with the second mechanical structure, the compliant mechanism being configured such that a measurement end of the mechanism moves in response to relative displacement between the first and second mechanical structures, the compliant mechanism further being configured such that the movement of the measurement end amplifies the relative displacement in a direction which is substantially perpendicular to a line between the point at which the compliant mechanism extends from the first bracket portion and the point of contact of the compliant mechanism with the second mechanical structure; and
- a sensor which measures the mechanically amplified movement of the measurement end.

10. A mechanical device according to claim 9, wherein the compliant mechanism is a compliant arm, the first bracket portion and the measurement end being at opposite ends of the arm, and the second mechanical structure making contact between the ends of the arm.

11. A mechanical device according to claim 9, wherein the device further includes a second bracket portion attachable to the second mechanical structure.

12. A mechanical device according to claim 11, wherein the second bracket portion includes a support which extends to a mount portion facing the measurement end, the sensor being mounted at the mount portion.

13. A mechanical device according to claim 9, wherein the sensor is a proximity sensor.

14. A mechanical device for amplifying relative displacement (X) between first and second mechanical structures, the device including:
- a first bracket portion attachable to the first mechanical structure,
- a compliant mechanism which extends from the first bracket portion to make contact with the second mechanical structure, the compliant mechanism being configured such that a measurement end of the mechanism moves in response to relative displacement between the first and second mechanical structures, the compliant mechanism further being configured such that the movement of the measurement end amplifies the relative displacement; and
- a sensor which measures movement of the measurement end which is mechanically amplified;

wherein the device further includes a second bracket portion attached to the second mechanical structure, the second bracket portion including a support which extends to a cantilevered mount portion facing the measurement end, the sensor being mounted at the mount portion.

15. A mechanical device according to claim 14, wherein the compliant mechanism is a compliant arm, the first bracket portion and the measurement end being at opposite ends of the arm, and the second mechanical structure making contact between the ends of the arm.

16. A mechanical device according to claim 14, wherein the sensor is a proximity sensor.

* * * * *